(12) United States Patent
Pong

(10) Patent No.: US 10,112,682 B2
(45) Date of Patent: Oct. 30, 2018

(54) METHOD TO SEVER AND DISENGAGE A BICYCLE DRIVETRAIN BETWEEN THE CRANK AXIS AND REAR WHEEL AXLE, THEREBY ENABLING A FOLD IN THE BICYCLE FRAME AT A SPECIFIED POINT BETWEEN SAID CRANK AXIS AND REAR WHEEL AXLE ON A VERTICAL OR NEAR VERTICAL AXIS PARALLEL TO THE PLANE OF THE DRIVE TRAIN

(71) Applicant: Alex Pong, Raymond, WA (US)

(72) Inventor: Alex Pong, Raymond, WA (US)

(73) Assignee: T. PONG COMPANY, Raymond, WA (US)

( * ) Notice: Subject to any disclaimer, the term of this patent is extended or adjusted under 35 U.S.C. 154(b) by 485 days.

(21) Appl. No.: 14/990,629

(22) Filed: Jan. 7, 2016

(65) Prior Publication Data
US 2017/0197686 A1    Jul. 13, 2017

(51) Int. Cl.
*B62M 11/02*    (2006.01)
*B62K 15/00*    (2006.01)

(52) U.S. Cl.
CPC .......... *B62M 11/02* (2013.01); *B62K 15/008* (2013.01)

(58) Field of Classification Search
CPC ...... B62M 11/02; B62K 15/00; B62K 15/006; B62K 15/008; F16H 2057/0093
USPC ............................................. 280/261; 74/405
See application file for complete search history.

(56) References Cited

U.S. PATENT DOCUMENTS

| | | | | |
|---|---|---|---|---|
| 616,665 | A | * 12/1898 | Hartzell | A01C 19/00 74/67 |
| 1,332,709 | A | * 3/1920 | Chrobak | B62M 11/02 280/260 |
| 2,687,897 | A | * 8/1954 | Wells | B62M 11/02 280/260 |
| 4,438,942 | A | * 3/1984 | Hon | B62K 15/006 280/274 |
| 4,911,458 | A | * 3/1990 | Lin | B62K 15/006 280/278 |
| 5,002,296 | A | * 3/1991 | Chiu | B62M 11/02 280/260 |

(Continued)

FOREIGN PATENT DOCUMENTS

| | | | |
|---|---|---|---|
| DE | 202011107981 U1 | * 11/2011 | ............ B62M 11/02 |
| JP | 2008247083 A | * 10/2008 | |
| WO | WO-2012026751 A2 | * 3/2012 | .............. B62M 9/02 |

*Primary Examiner* — Joseph M Rocca
*Assistant Examiner* — Conan D Duda

(57) ABSTRACT

Employing a set of open gears in a bicycle drivetrain allows disengaging the connection between the crank arms and the driven wheel. When the fold axis passes approximately through the mesh plane between the aforementioned gears, and said axis is offset from the center plane of the gears in the direction of the fold by at least one-half the gear width, by design even a small angular displacement around the fold axis opens instantly producing a gap between the gears that increases as the fold proceeds, thus breaking and disengaging the connection between the crank arms and driven wheel, thus leaving the displacement of the fold to complete its angular cycle without regard or interference from the newly separated drivetrain. In its folded configuration, the bicycle can roll backwards, forwards, and spin or pirouette on its own axis.

5 Claims, 10 Drawing Sheets

(56) References Cited

U.S. PATENT DOCUMENTS

| | | | | |
|---|---|---|---|---|
| 5,269,550 A | * | 12/1993 | Hon | B62K 15/006 280/278 |
| 6,196,566 B1 | * | 3/2001 | Zhang | B62K 15/008 280/278 |
| 6,796,200 B2 | * | 9/2004 | Kelly | B62M 3/04 74/349 |
| 8,020,883 B2 | * | 9/2011 | Brusca | B62M 9/00 280/260 |
| 8,348,294 B1 | * | 1/2013 | Moldestad | B62K 15/008 180/206.4 |
| 8,430,414 B1 | * | 4/2013 | Yap | B62K 15/008 280/278 |
| 2004/0032110 A1 | * | 2/2004 | Bigot | B62K 15/008 280/287 |
| 2006/0071445 A1 | * | 4/2006 | Mihelic | B62K 15/00 280/287 |
| 2006/0175797 A1 | * | 8/2006 | Sanders | B62K 15/006 280/287 |
| 2010/0212978 A1 | * | 8/2010 | Huang | B62K 15/008 180/65.31 |
| 2013/0062859 A1 | * | 3/2013 | Moldestad | B62K 21/00 280/270 |
| 2016/0137254 A1 | * | 5/2016 | Lee | B62K 11/02 180/208 |
| 2017/0247076 A1 | * | 8/2017 | Uimonen | B62K 3/02 |

\* cited by examiner

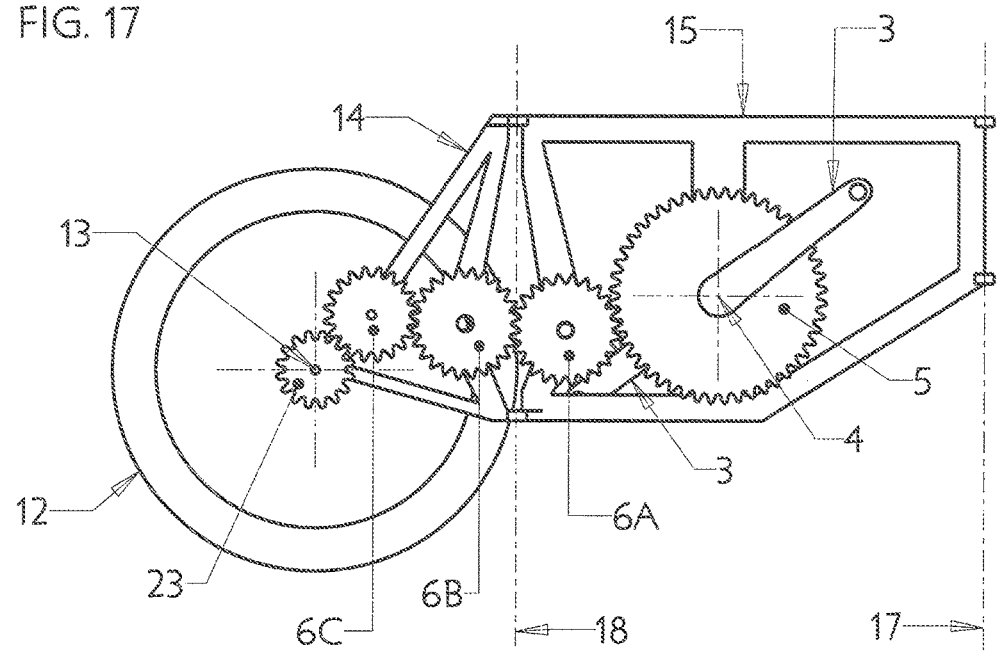

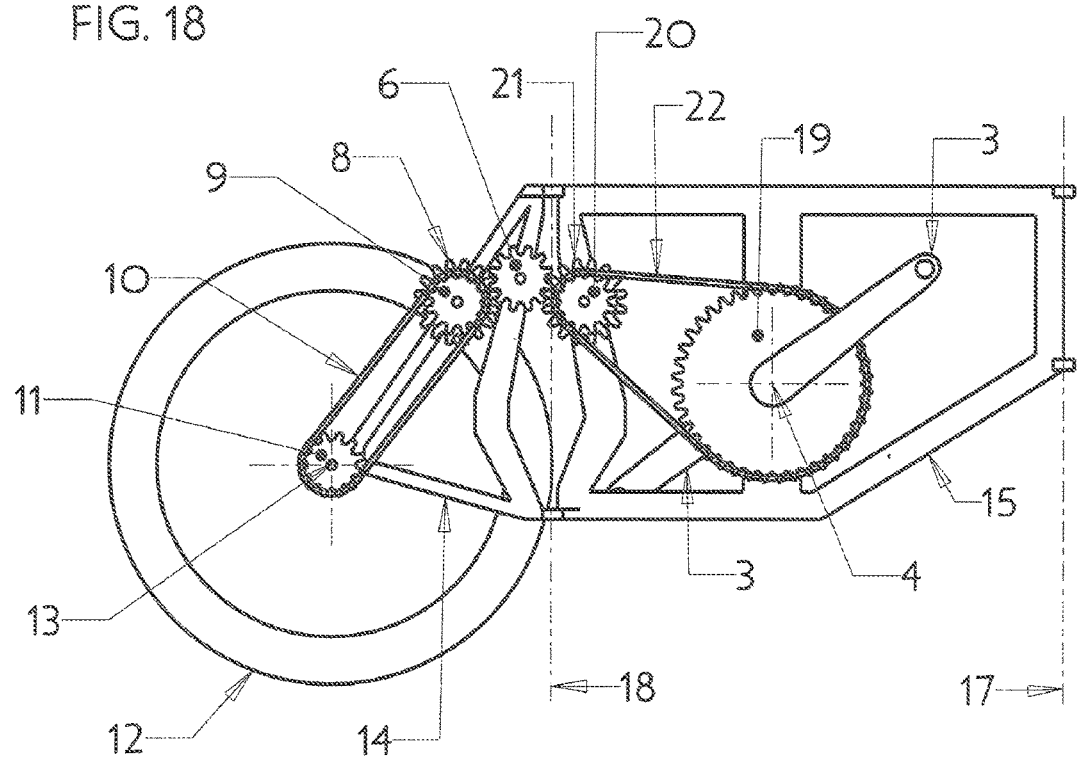

METHOD TO SEVER AND DISENGAGE A BICYCLE DRIVETRAIN BETWEEN THE CRANK AXIS AND REAR WHEEL AXLE, THEREBY ENABLING A FOLD IN THE BICYCLE FRAME AT A SPECIFIED POINT BETWEEN SAID CRANK AXIS AND REAR WHEEL AXLE ON A VERTICAL OR NEAR VERTICAL AXIS PARALLEL TO THE PLANE OF THE DRIVE TRAIN

A method to sever and disengage a bicycle drivetrain between the crank axis and rear wheel axle, thereby enabling a fold in the bicycle frame at a specified point between said crank axis and rear wheel axle on a vertical or near vertical axis parallel to the plane of the drive train.

BACKGROUND OF THE INVENTION

Heretofore folding bicycles have been limited in their folding efficiency and minimum folded dimensions because they cannot intersperse any of their fold axes, either singular of several, across the frame between the crank axis, or bottom bracket as it is known in the trade, and the rear wheel axle. Folding bicycles have of necessity therefore kept intact and maintained the integrity of the drivetrain from the chain rings through to the rear wheel sprocket(s) by locating their primary fold(s) in the frame so that the axes of the fold(s) will not violate or in any way intersect the plane of the drivetrain between the axis of the crank axis and the rear wheel axle, thereby limiting at least one of the minimum dimensions of the bicycle in its folded configuration to the sum of the radius of the rear wheel, the radius of the largest chain ring, and the distance from the crank axis to the rear wheel axle. While derailleur equipped bicycles use drivetrains with some lateral flexibility, a transmission chain that can flex laterally enough to enable any kind of fold does not exist.

BRIEF SUMMARY OF THE INVENTION

The drivetrain is disengaged by utilizing at least one set of open gears in the drive train and placing a hinge in the frame between the rear wheel axle and the crank axis to allow the rear subframe and the rear wheel to fold so as to lie along one side of the mainframe. When a second hinge is placed in the frame forward of the crank axis, the front subframe and the front wheel will fold to the opposite side of the main frame thereby reducing the final dimensions of the folded bicycle. With the drivetrain no longer engaged, the bicycle in its folded configuration will roll freely backwards or forwards on both wheels, something no other folded bicycle can currently do because of the inherent one way properties of the Sprags or freewheels employed on most bicycles. With both wheels capable of rolling in either direction, the folded bicycle can pirouette or be spun with one wheel going in one direction and the other wheel rolling in the opposite direction, also impossible with current folding bicycles. The details that follow represent one of several ways in which these concepts may be applied.

BRIEF DESCRIPTION OF THE DRAWINGS

FIG. 17 is a side elevation view of a bicycle drivetrain comprised of all gears (no sprockets or transmission chains), with view including mainframe, rear subframe, and rear wheel.

FIG. 18 is a side elevation view of a bicycle drivetrain comprised of gears, sprockets and two transmission chains) with view including the primary drive input sprocket, primary drive transmission chain, primary drive output sprocket, primary drive output gear, idler gear, final drive input gear, final drive input sprocket, final drive transmission chain, final drive output sprocket; the bicycle main frame, rear subframe, and rear wheel.

DETAILED DESCRIPTION OF THE INVENTION

Figure 2:
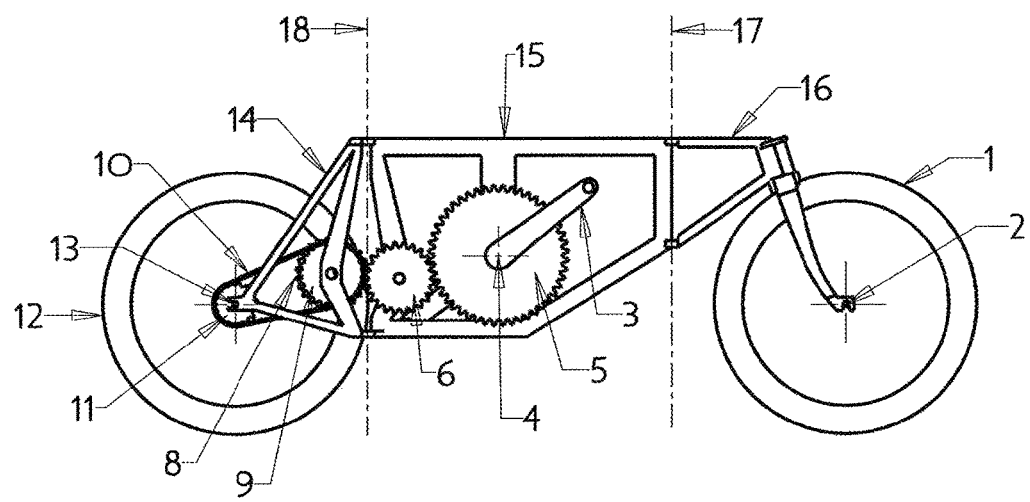
FIG. 2 is a side elevation view of the bicycle frame, wheels and drivetrain in FIG. 1.
Figure 11:
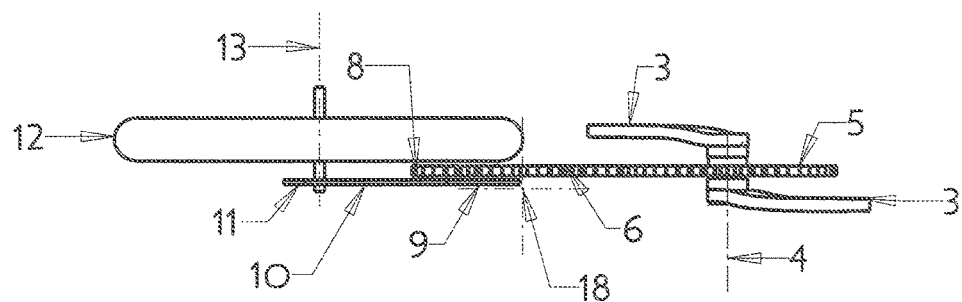
FIG. 11 is a top plan view of the bicycle drivetrain and rear wheel in riding configuration.
Figure 12:
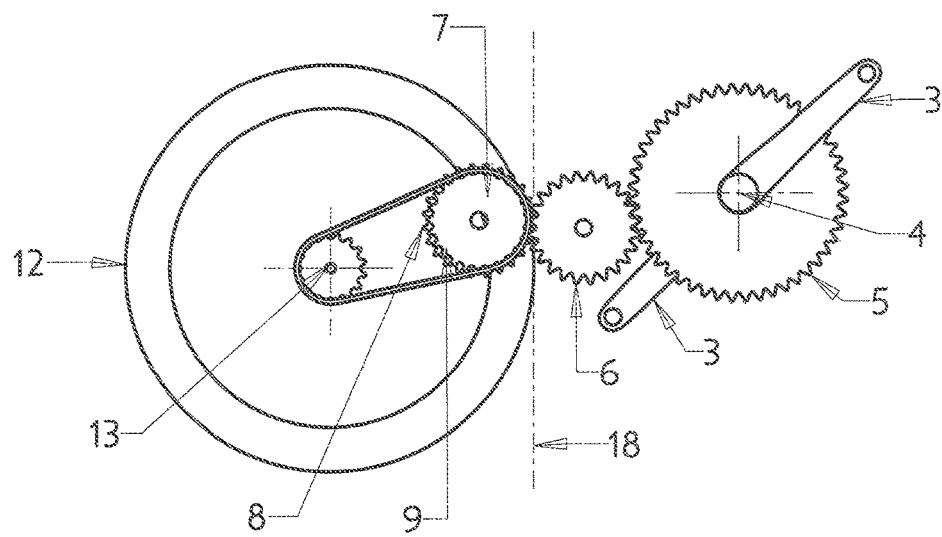
FIG. 12 is a side elevation view of the bicycle drivetrain and rear wheel in FIG. 11.
Figure 13:
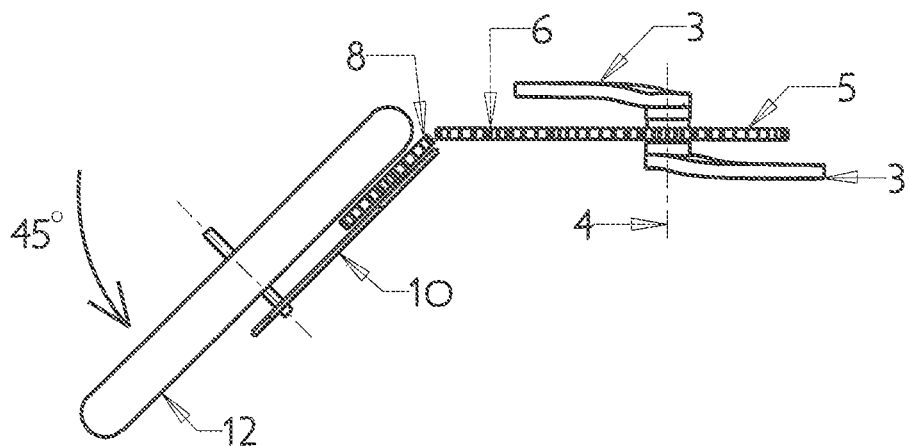
FIG. 13 is a top plan view of the bicycle drivetrain and rear wheel with drivetrain gear disengagement positioned at the first 45° of its 180° fold as it progresses from riding configuration to a fully folded configuration.
Figure 14:
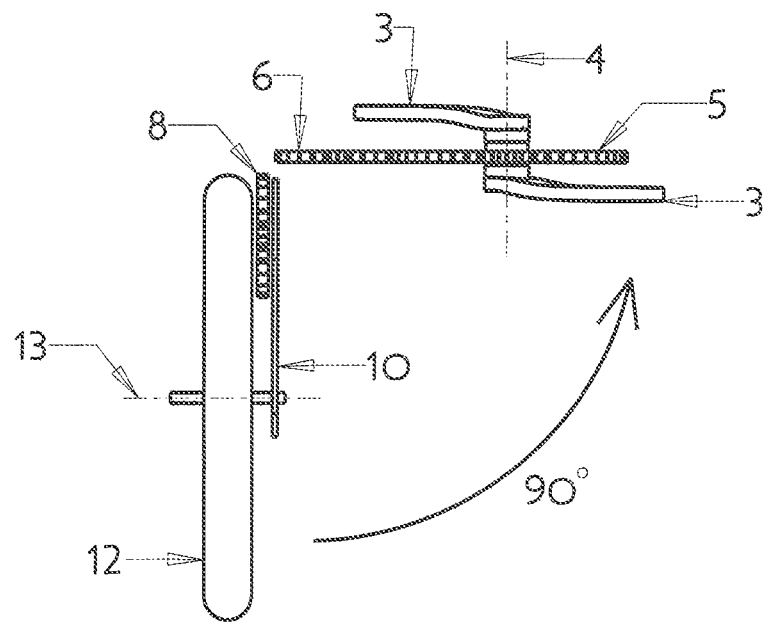
FIG. 14 is a top plan view of the bicycle drivetrain and rear wheel with drivetrain gear disengagement positioned at 90° of its 180° fold as it progresses from riding configuration to a fully folded configuration.
Figure 15:
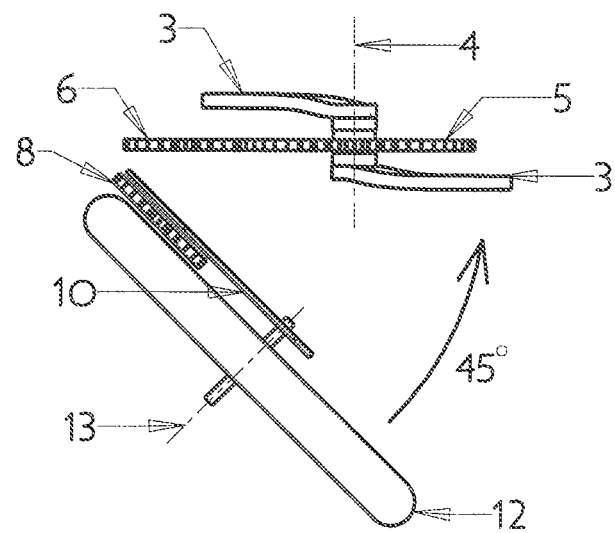
FIG. 15 is a top plan view of the bicycle drivetrain and rear wheel with drivetrain gear disengagement positioned at 135° of its 180° fold (45° yet to go) as it progresses from riding configuration to a fully folded configuration.
Figure 16:
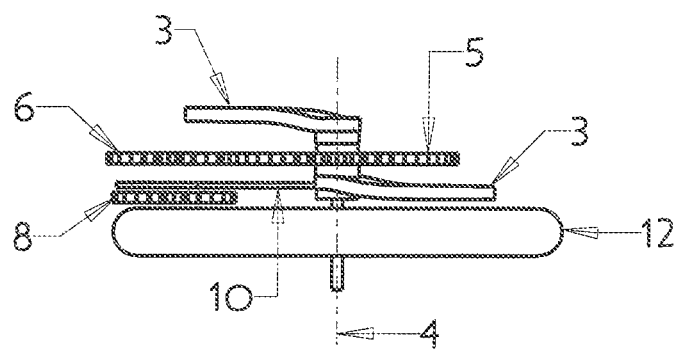
FIG. 16 is a top plan view of the bicycle drivetrain and rear wheel in its fully folded configuration.

The bicycle drivetrain is severed, disengaged, and re-engaged by utilizing at least one set of open gears (6,8 in FIGS. 2, 11-16) in the drive train and placing a hinge in the bicycle frame between the rear wheel axle (13) and the crank axis (4) to allow the rear subframe (14) and the rear wheel (12) to fold approximately 180° so as to lie along one side of the mainframe (15).

A large gear(s), hereinafter called the bull gear (5), is substituted for the traditional crank chain ring(s) which meshes with an idler gear (6), or any other combination of an odd number of idler gears (6) to maintain the correct direction of rotation, attached to the bicycle main frame (15). The idler gear (6) (or final idler gear if there is more than one) meshes with a final drive input gear (8) attached to the rear subframe (14). This final drive input gear (8) is slaved to the final drive input sprocket (9) which, by means of a final drive transmission chain (10), drives the usual free hub or final drive output sprocket (11) attached to the rear wheel (12).

If the fold axis herein known as the rear frame hinge axis (18) passes approximately through the mesh plane between the idler gear (6) and final drive input gear (8), or in some cases the bull gear (5) and the idler gear (6); and the rear frame hinge axis (18) is offset from the center line of the gear in the direction of the fold by a minimum of one-half the width of the gear, then as the fold proceeds from its riding position to its 180° folded position, the mesh plane between the two effective gears (6,8) will open up to allow the fold to complete thus breaking and disengaging the drivetrain idler gear (6) which is attached to the main frame (15) from the final drive input gear (8) which is attached to the rear subframe (14).

Returning the bicycle from its folded configuration to its riding configuration and re-engagement of the drivetrain is accomplished automatically by reversing the above folding process.

With this invention, it can easily be seen that several modifications and variations (two of which are described below) in the number and arrangements of gears and/or sprockets and chains in the drivetrain can be made without departing from the scope and spirit of this invention as long as the open set of gears (6,8 in FIGS. 2, 11-16) is correctly placed, the appropriate direction of gear/sprocket rotation is maintained, and the rear frame hinge axis (18) is appropriately located to allow successful disengagement and re-engagement of said gears (6,8 FIGS. 2, 11-16).

One such drivetrain variation (FIG. 17) is restricted to gears (no sprockets or transmission chains) and is configured with a drivetrain bull gear (5) meshing in sequence with three idler gears (6A,6B,6C) with the last idler gear (6C) meshing with the final drive output gear (23) which is slaved to the rear wheel (12). In this example the required open set of gears consists of two of the idler gears (6A,6B) between which the drivetrain is, as in the first example, successfully disengaged and re-engaged and the rear subframe (14) folded to lie along side of the bicycle main frame (15).

Another drivetrain variation (FIG. 18) employs gears, sprockets, and two transmission chains. The drivetrain uses a primary drive system that meshes with an idler gear (6) that meshes with a final drive system. This drivetrain consists of the primary drive input sprocket (19) which uses the primary drive transmission chain (22) to drive the primary drive output sprocket (20) slaved to a primary drive output gear (21) that meshes with the idler gear (6) that meshes with the final drive input gear (8) slaved to the final drive input sprocket (9) that uses a final drive transmission chain (10) to drive a final drive output sprocket(s) (11) slaved to the rear wheel (13). In this example the required set of open gears (6,21) is formed by the idler gear (6) which is attached to the rear subframe (14) and the primary drive output gear (21) attached to the main frame (15). As in the first two examples, the drivetrain can be successfully disengaged and re-engaged and the rear subframe (14) folded to lie along side of the bicycle main frame (15).

Figure 1:
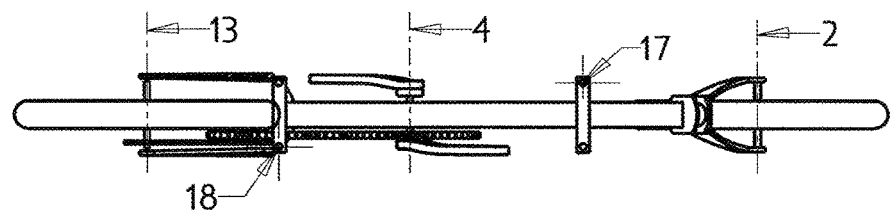
FIG. 1 is a top plan view of the bicycle frame, wheels and drivetrain in riding configuration.
Figure 3:
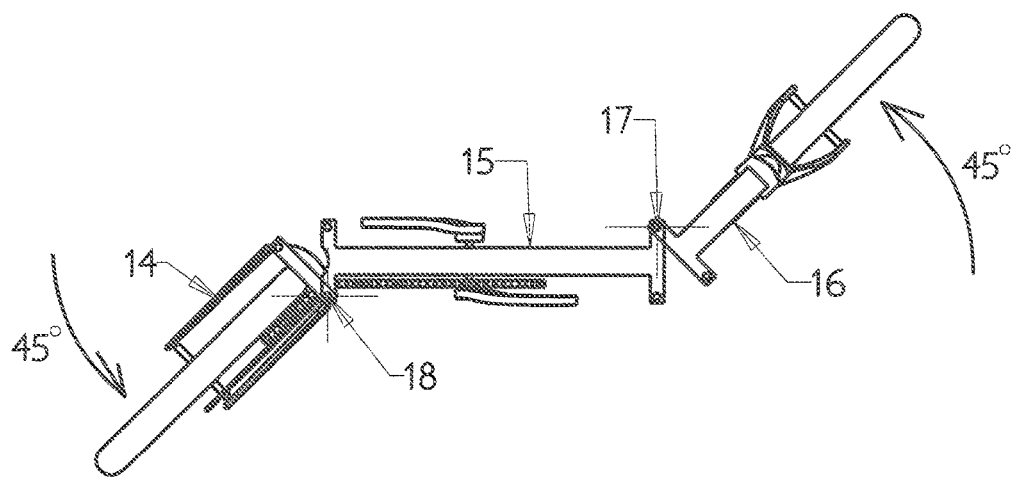
FIG. 3 is a top plan view of the bicycle frame, wheels, and drivetrain positioned at the first 45° of its 180° fold as it progresses from riding configuration to a fully folded configuration.
Figure 4:
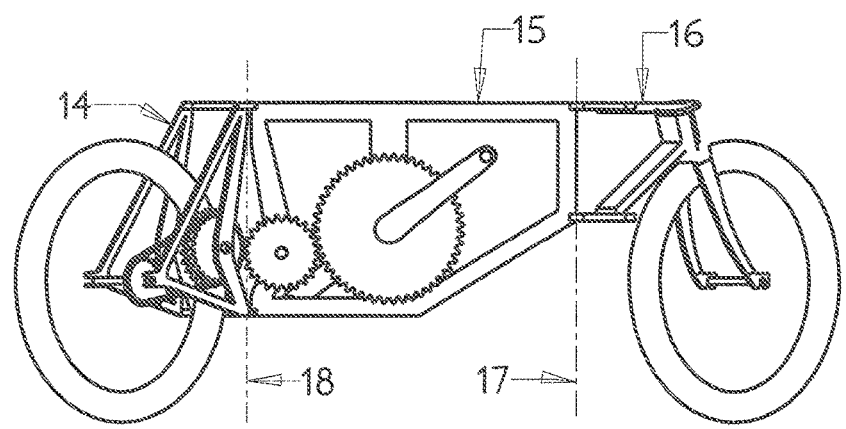
FIG. 4 is a side elevation view of the bicycle frame, wheels, and drivetrain in FIG. 3.
Figure 5:
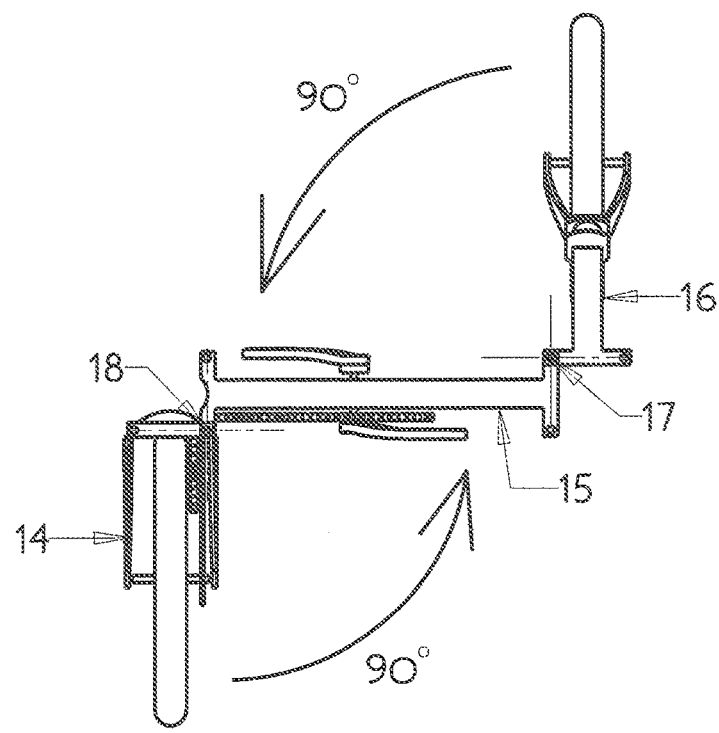
FIG. 5 is a top plan view of the bicycle frame, wheels, and drivetrain positioned at 90° of its 180° fold as it progresses from riding configuration to a fully folded configuration.
Figure 6:
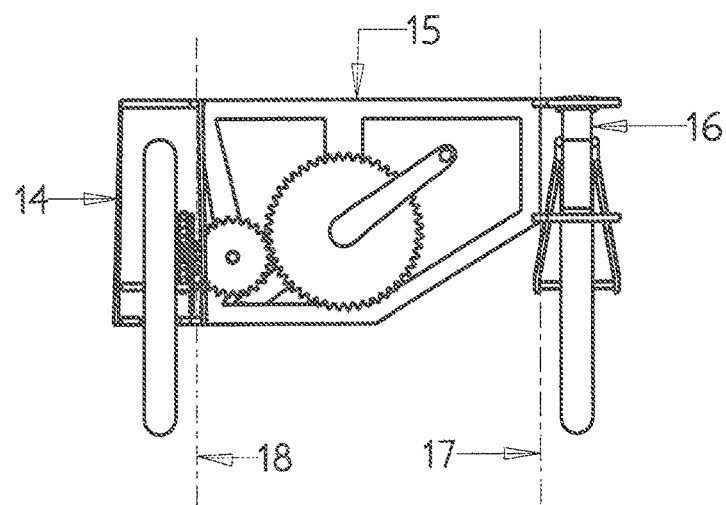
FIG. 6 is a side elevation view of the bicycle frame, wheels, and drivetrain in FIG. 5.
Figure 7:
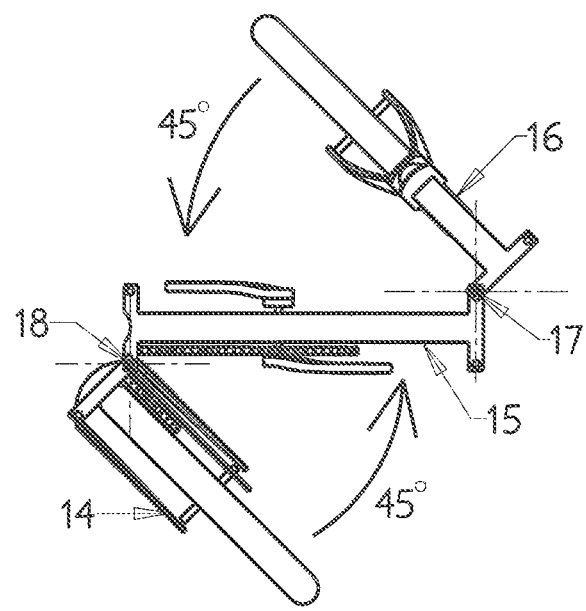
FIG. 7 is a top plan view of the bicycle frame, wheels, and drivetrain positioned at 135° of its 180° fold (45° yet to go) as it progresses from riding configuration to a fully folded configuration.
Figure 8:
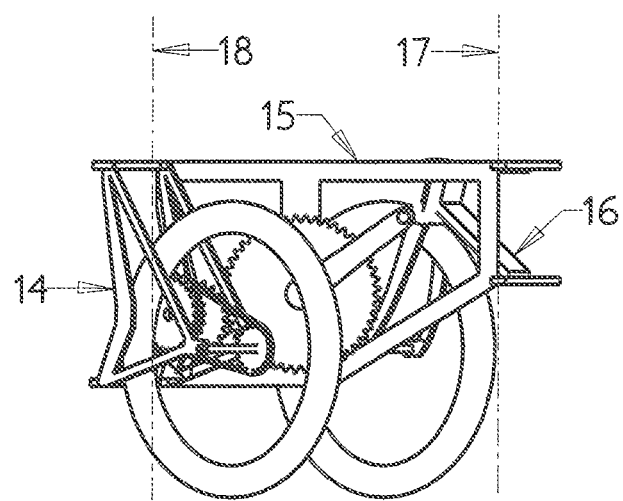
FIG. 8 is a side elevation view of the bicycle frame, wheels, and drivetrain in FIG. 7.
Figure 9:
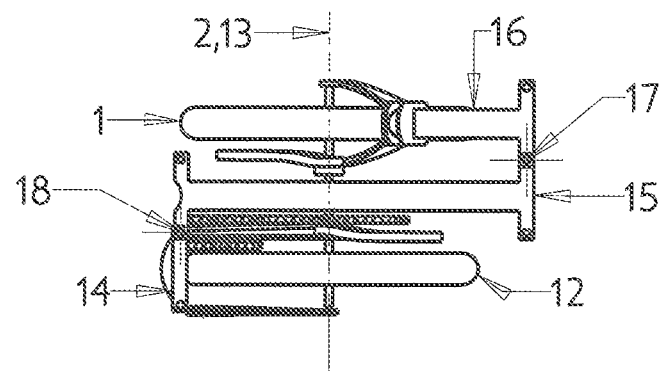
FIG. 9 is a top plan view of the bicycle frame, wheels, and drivetrain in its fully folded configuration.
Figure 10:
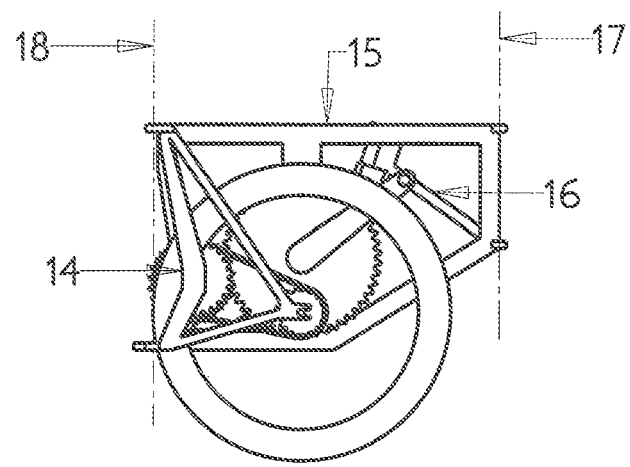
FIG. 10 is a side elevation view of the bicycle frame, wheels, and drivetrain in FIG. 9.

A second order advantage in folding a bicycle across the drivetrain is made possible by the above described breaking and disengagement of the drive train. When the connection between the crank arms (3) and the rear wheel (12) is severed (FIGS. 11-16), the folded bicycle can be rolled in either direction without activating the back drive inherent in all free wheel, Sprag, or overrunning clutch devices as used in bicycle drivetrains wherein reverse rotation of the rear wheel drives the cranks. Folded bicycles generally have no room to accommodate the rotation of a crank and pedal arrangement being back driven through the free wheel and therefore no current folding bicycle can be rolled on its main wheels in both directions. If a second fold of any appropriate design [with its front frame hinge axis (17) offset to enable the front subframe (16) to fold in the opposite direction from the fold of the rear subframe (14)] is placed in the frame forward of the crank axis (4) in a bicycle employing a severable drivetrain (FIGS. 1-10), both front (1) and rear (12) wheels can be made to roll on a common axis thereby facilitating its maneuvering ability and creating a smaller and more convenient folded package. The front wheel (1) being disposed on the front subframe (16) on a front wheel rotational axis (2).

I claim:

1. A folding bicycle comprising:
    a frame having a front subframe, a middle subframe, and a rear subframe;
    the front subframe and the rear subframe are coupled to opposite front and rear ends of the middle subframe via a front hinge and a rear hinge, respectively;
    the front hinge defining a front axis that runs vertically there through and the rear hinge defining a rear axis that runs vertically there through;
    the folding bicycle configured to have a first unfolded configuration for operation wherein the front, middle, and rear subframes are disposed lengthwise along a single axis, the front subframe is positioned in front of the middle and rear subframes, the middle subframe is position between the front and rear subframes, and the rear subframe is positioned behind the front and middle subframes;
    the folding bicycle configured to a have a second folded configuration for storage wherein the front and rear subframes are each folded 180° with respect to the middle subframe and are positioned parallel thereto;
    a front wheel coupled to the front subframe;
    a rear wheel coupled to the rear subframe about a rotational axis, the rear wheel having a rear wheel sprocket operatively coupled thereto and disposed along the rotational axis;
    a crankset coupled to the middle subframe, the crankset including a crank sprocket;
    a rear wheel drivetrain having at least a first gear intermeshed with a second gear, the rear wheel drivetrain operatively coupling the crank sprocket to the rear wheel sprocket and configured to drive the rear wheel of the folding bicycle via rotation of the crankset;
    wherein the first gear of the rear wheel drivetrain is disposed on the middle subframe and the second gear of the rear wheel drivetrain is disposed on the rear subframe, the first and second gears intermeshed with one another along the rear axis when the folding bicycle is in the first unfolded configuration, and
    wherein the first and second gears are disengaged from one another and parallel to each other when the folding bicycle is in the second folded configuration thereby disengaging the crankset from the rear wheel and allowing the rear wheel to freely rotate in either direction independent of the crankset.

2. The folding bicycle according to claim 1, wherein the rear wheel drivetrain is directly intermeshed with the crankset sprocket on one end and directly intermeshed with the rear wheel sprocket on the opposite end when the folding bicycle is in the first unfolded configuration.

3. The folding bicycle according to claim 1, further comprising a rear chain operatively coupling the second gear of the rear wheel drivetrain to the rear wheel sprocket.

4. The folding bicycle according to claim 1, further comprising a first chain, a second chain, and a third gear of the rear wheel drivetrain, wherein the first chain operatively couples the first gear of the rear wheel drivetrain to the crankset sprocket, the third gear of the rear wheel drivetrain is disposed on the rear subframe and intermeshed with the second gear of the rear wheel drivetrain, and the second chain operatively couples the third gear of the rear wheel drivetrain to the rear wheel sprocket.

5. The folding bicycle according to claim 1, wherein the front axis is laterally offset from the rear axis in a direction perpendicular to the longitudinal axis of the folding bicycle with respect to the first unfolded configuration.

* * * * *